(12) United States Patent
James

(10) Patent No.: US 11,363,131 B2
(45) Date of Patent: Jun. 14, 2022

(54) PREVENTION OF USAGE OF HARMFUL RADIO SYSTEMS OF A MOBILE APPARATUS IN A DELIMITED AREA

(71) Applicant: Saronikos Trading and Services, Unipessoal LDA, Madeira (PT)

(72) Inventor: Robert James, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 0 days.

(21) Appl. No.: 16/648,964

(22) PCT Filed: Sep. 20, 2017

(86) PCT No.: PCT/IB2017/055694
§ 371 (c)(1),
(2) Date: Mar. 19, 2020

(87) PCT Pub. No.: WO2019/058156
PCT Pub. Date: Mar. 28, 2019

(65) Prior Publication Data
US 2020/0259949 A1    Aug. 13, 2020

(51) Int. Cl.
*H04M 1/72463* (2021.01)
*H04M 1/72454* (2021.01)
*H04M 1/72457* (2021.01)

(52) U.S. Cl.
CPC ... *H04M 1/72463* (2021.01); *H04M 1/72454* (2021.01); *H04M 1/72457* (2021.01); *H04M 2250/02* (2013.01)

(58) Field of Classification Search
CPC ......... H04M 1/72463; H04M 1/72457; H04M 1/72454; H04M 2250/02
See application file for complete search history.

(56) References Cited

U.S. PATENT DOCUMENTS

2008/0214211 A1    9/2008  Lipovski
2012/0115512 A1*   5/2012  Grainger .................. G01S 5/02
                                                    455/456.3
(Continued)

FOREIGN PATENT DOCUMENTS

WO       2016/133436 A1    8/2016

OTHER PUBLICATIONS

International Search Report dated May 9, 2018, issued in PCT Application No. PCT/IB2017/055694, filed Sep. 20, 2017.
(Continued)

*Primary Examiner* — Margaret G Mastrodonato
(74) *Attorney, Agent, or Firm* — Workman Nydegger

(57) ABSTRACT

The invention relates to a wireless set, beacon apparatus, method and a computer program product for preventing the use of means that can generate harmful interference in a "prohibition area". A beacon broadcasts a state signal, specifying prohibition or permission to use potentially harmful means, while its transmission range delimits the prohibition area in which the prohibition applies. A beacon receiver, included in the wireless set which also includes potentially harmful means, is active only in a beacon location area, including at least a fraction of a prohibition area. The beacon location areas are defined and stored in a digital memory of the wireless set. According to the received state signal, the potentially harmful means are induced to a deactivation state or to a regular operation state.

18 Claims, 2 Drawing Sheets

(56) References Cited

U.S. PATENT DOCUMENTS

| | | |
|---|---|---|
| 2014/0087758 A1 | 3/2014 | Maor |
| 2014/0288820 A1 | 9/2014 | Opshaug et al. |
| 2016/0021199 A1 | 1/2016 | Krimon et al. |
| 2016/0156638 A1* | 6/2016 | Somani ............... H04W 12/12 726/7 |

OTHER PUBLICATIONS

Written Opinion dated May 9, 2018, issued in PCT Application No. PCT/IB2017/055694, filed Sep. 20, 2017.

* cited by examiner

PREVENTION OF USAGE OF HARMFUL RADIO SYSTEMS OF A MOBILE APPARATUS IN A DELIMITED AREA

FIELD OF THE INVENTION

The present invention relates to a wireless set, a beacon apparatus, a method, and a computer program product for preventing the use, in a delimited area, of radio systems, which can generate harmful interferences. In particular, it concerns the use of a short range communication system for inducing potentially harmful radio systems in a deactivation state when their use is prohibited, or resuming a regular operation state when their use is permitted.

DESCRIPTION OF PRIOR ART

The cellular networks are important and effective means of communications. They should be available everywhere, and actually almost they are. However, in some delimited areas or particular places their use can be annoying or even dangerous, because of the audio noise and radio interferences that the mobile phones may produce. Typical places where the full operation of cellular phones may be prohibited are aircraft cabins during some flight phases, because they could cause harmful interference to flight control means. However, the use of cellular phones may also be prohibited in hospitals, theatres, museums, holy places, conference rooms, and other places where some kinds of electronic equipment are in operation or people gather for some particular purpose.

People entering these places are invited to turn off their phones, but it may happen that the invitation is not met for a number or reasons and, if it is met, it may happen that, after leaving the prohibition area, they forget to resume the regular operation of their phones.

Several solutions have been proposed to overcome the above inconveniences, but none of them is fully satisfactory.

Some proposed solutions require the installation, at the borders of prohibition areas, of additional particular ad-hoc base stations, which are based on Global System for Mobile Communications (GSM) and emit signals causing mobile phones to turn off their power supply. This entails a high complexity at the prohibition area side and does not solve the problem of resuming the regular operation of the mobile phone when their banning is removed. Another disadvantage of the GSM based system is the need to install additional and costly hardware components. Another disadvantage is that a GSM base station, in particular the type of cellular coverage, provides just an inaccurate and imprecise definition of a prohibition area. Further disadvantages caused by a cellular coverage approach is the fact that a determination of a prohibited area is just possible by reverting to the level of installed base stations, which are usually controlled by a higher management level such as specific global providers, so that the determination or modification of said prohibition area would be problematic. It should be noted that in general the usage of cell based determination of prohibition areas is not feasible due to the insufficient possibility to define small subareas as prohibition areas. Therefore, such kind of solution is not applicable due to the insufficient coverage possibility for determining prohibited areas.

Other solution envisage an additional sensor as an always-on sensing system, whereby in the delimited area a prohibition signal is transmitted, while the mobile devices are equipped with the aforementioned additional and costly sensors to sense that prohibition signal. Upon detecting the prohibition signal a power supply controller stops the supply of electric power to the radio transceivers, thus halting the radio communications, while the mobile device resumes its regular operation when the prohibition signal is no more detected. However, turning-off the power of the radio section of a cellular phone needs a specific application, whose installation requires access to the root operating system files. Therefore, such kind of solution is hardly applicable to a significant percentage of the devices on the market. Another disadvantage is the costly implementation of the additional sensor, which consumes more electrical power and increases also the complexity while manufacturing such devices. In this way such devices equipped with the additional sensor are more complex on the hardware level as well as on the level of the operating system.

Moreover, an always-on sensor (or receiver) entails continuous additional power consumption.

SUMMARY OF THE INVENTION

It is therefore an object of the present invention to provide a wireless set, a beacon apparatus, a method and a computer program product for inducing the deactivation of potentially harmful means of wireless sets when their use is prohibited, and resuming a regular operation when their use is permitted. This is achieved by means of a device requiring only a small transmitter in the area in which the use of potentially harmful means might be prohibited, and a simple application in the set comprising said potentially harmful means, assuming that this set features the capabilities of a smartphone/tablet.

The Basic points of the different methods according to the present invention are:
  Signalizing "prohibition areas" based on low range beacon transmission;
  delimiting "prohibition areas", where the use of potentially harmful means may not be permitted, by means of a radio beacon, which has a tailored transmission range and carries a "state signal" indicating prohibition or permission to use potentially harmful means;
  equipping the wireless set with a "beacon receiver", which is allowed to stay in a deactivation state when the wireless set is far from prohibition areas;
  activating the beacon receiver when the wireless set gets near a prohibition area;
  setting, in the prohibition areas, the potentially harmful means to a deactivation state or to a permission state according to the indications carried by the received beacon.

The beacons delimiting the prohibition areas may be generated by small, low-power transmitters such as those using for Bluetooth low energy technology or beacons based on Wi-Fi standard or similar to Wi-Fi standard. Further according to one of the advantageous aspects of the present invention the beacon transmitter provides the possibility to set different signal strength levels depending on desired coverage in other words depending on desired distance for determining the prohibition area. Further according to another advantageous aspect of the present invention the beacon transmitter can be equipped with beam forming antennas to determine a specific direction for transmitting of beacons to delimit the prohibition areas. According to a first aspect of the present invention a wireless set is proposed, wherein the wireless set comprises the following elements: potentially harmful means, which have to be deactivated in a prohibition area, when in said prohibition area their use is prohibited, a beacon receiver for wirelessly receiving at least one beacon carrying at least a data packet, location means for generating location data defining a wireless set location area where said wireless set is located, memory means for storing program codes and data, input/output means for receiving and issuing data and commands, and processing means, in signal communication with at least one of the above said elements of said wireless set through a control bus, configured for receiving signals and data from said at least one of the above elements, executing program codes also on the basis of said received signals and data, and transmitting, to said at least one of the above elements, signals and data, wherein the wireless set is characterized in that it is adapted to receive and process said data packet comprising at least a service identity, identifying the beacon as a beacon demarcating a prohibition area, and a state signal, specifying prohibition or permission to use said potentially harmful means. As described above the received beacon signal may be a low range signal in particular of the type of a Bluetooth or Wi-Fi like standard. It should be underlined that the wireless set according to the present invention is adapted to receive and process the data packet and to identify the beacon as a beacon demarcating a prohibition area and also to derive the state signal specifying the prohibition or permission.

According to a further aspect of the present invention the wireless set is adapted to generate and emit by means of provided input/output means a switch signal, in the form of an audio and/or video signal and/or vibration, asking for setting said potentially harmful means to a deactivation state or indicating that a regular operation state can be resumed, dependent on said state signal of said beacon that is found by means of said beacon receiver. Alternatively or in addition to the aforementioned inventive aspect the wireless set is adapted to provide an automatic switch means for automatically setting said potentially harmful means to a deactivation state or resuming a regular operation state, dependent on said state signal through an electric switch signal received through said control bus, wherein said switch signal generated and emitted by said processing means is in the form of said electric signal for said switch means to automatically perform said automatic setting. According to the aforementioned advantageous alternative the wireless set is capable to perform the desired setting of potentially harmful means automatically dependent on the received beacon signal.

In accordance to the above description of the wireless set, the present invention foresees a corresponding beacon apparatus for transmission of a beacon carrying at least a data packet, wherein the data packet comprises at least a service identity, identifying the beacon as a beacon demarcating a prohibition area and a state signal, specifying prohibition or permission to use said potentially harmful means. The aforementioned beacon apparatus may be further adapted in such a way that a portion of said data packet, in particular said at least service identity and/or said state signal, is adapted to initiate on a wireless set the generation and emittance, through a input/output means of said wireless set, a switch signal, in the form of an audio and/or video signal and/or vibration, asking for setting said potentially harmful means to a deactivation state or indicating that a regular operation state can be resumed, dependent on said state signal of said beacon and/or to initiate an automatic setting of said potentially harmful means to a deactivation state or resuming a regular operation state, dependent on said state signal.

Further advantageous aspects of the present invention through incorporation of location means are described in what follows.

The location data needed to locate the wireless set may be obtained from a number of location services and available data, comprising data that can be derived from GPS, Wi-Fi Access Points, cellular networks, and other systems, which are generally used for other purposes. Therefore, the location of the wireless set generally does not entail any additional power consumption.

The detection of the proximity of a wireless set to a prohibition area is performed by defining "beacon location areas", which are the locations where prohibition areas are found. For example, a beacon location area may be the routing area of a GPRS (General Packet Radio Service) network which covers an airport area or a disk defined by center and radius. Generally, the beacon location areas may be provided by a Location-Based Service (LBS), or by other means, and are stored in a "beacon location database".

If the wireless set is a smartphone or a tablet, which is generally equipped with Bluetooth and/or Wi-Fi facility, processing means, location means, memory means, and input/output means, and the deactivation and activation of the potentially harmful means are induced by audio and/or video alerts, the implementation of the feature described above only need a simple application, which generally may be easily downloaded and installed over the air. Alternatively, the potentially harmful means may automatically be set to a deactivation state or resumed to a regular operation, if the wireless set supports the automatic execution of the appropriate procedure to shut down applicable radio signals, however, since these automatic operations could raise security issues, some operating systems prevent applications to interact with radios directly. In this case the generation of an alerting signal can solve easily the problem.

Hence, the method of the invention is easily applicable to a large percentage of smartphones and/or tablets with mobile connection with low costs at both the prohibition area side and the smartphone and/or tablet side.

Further advantageous features of the present invention are illustrated below in the detailed description of the invention and are set forth in the attached claims.

BRIEF DESCRIPTION OF THE DRAWINGS

The features of the invention are specifically set forth in the claims annexed to this description; such features will become clearer from the following description of a preferred and non-exclusive embodiment shown in annexed drawings, wherein:

DETAILED DESCRIPTION OF THE INVENTION

Figure 1:
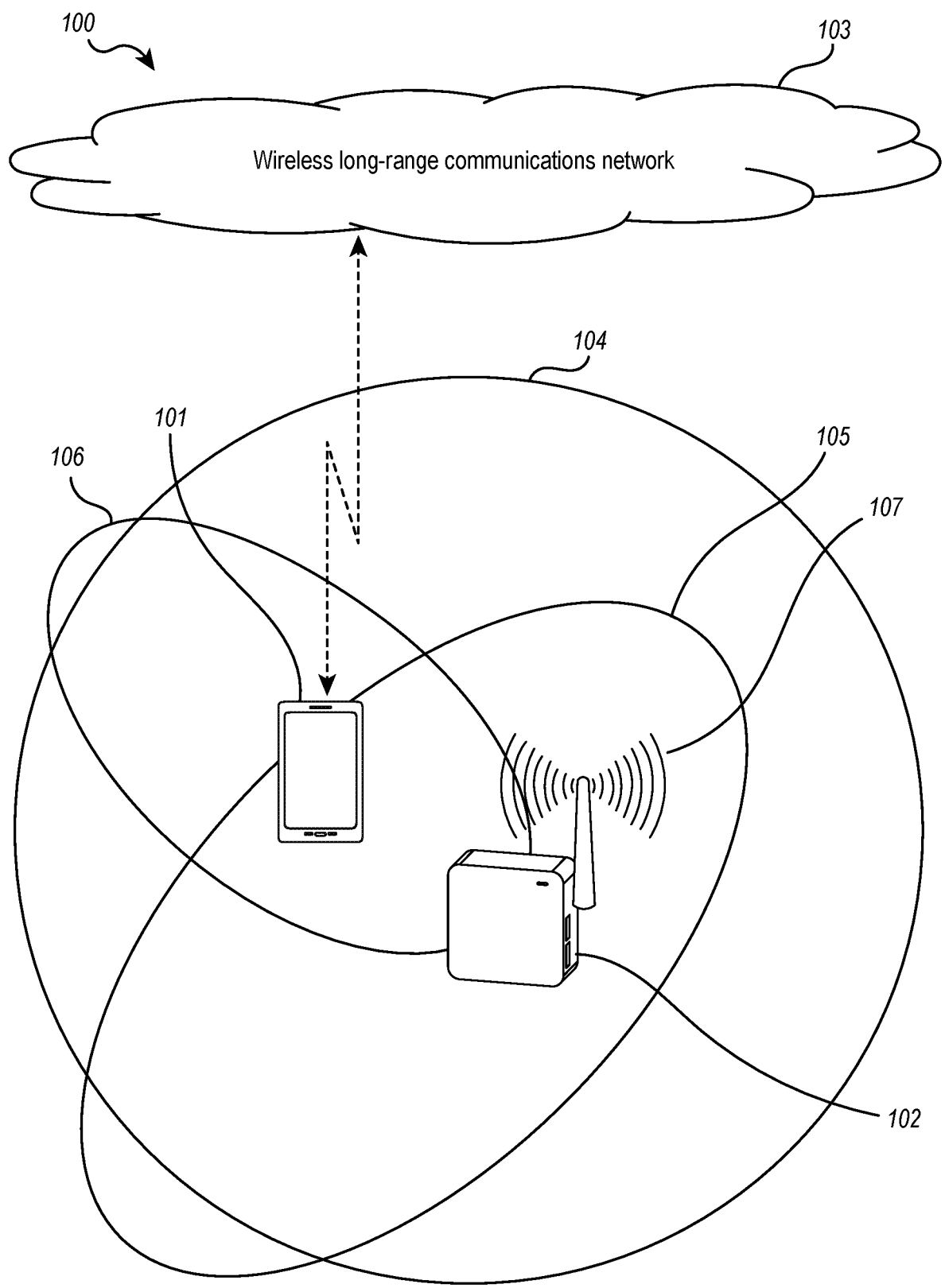
FIG. 1 illustrates a typical set of elements constituting the system according to the invention.

In this description, any reference to "an embodiment" will indicate that a particular configuration, structure or feature, described in regard to the implementation of the invention, is comprised in at least one embodiment. Therefore, the expression "in an embodiment" and other similar phrases, which may be present in different parts of this description, will not necessarily be all related to the same embodiment. Furthermore, any particular configuration, structure or feature may be combined in one or more embodiments, in any way deemed appropriate. The numerical references below are therefore used only for the sake of simplicity, and do not limit the protection scope or extension of the invention and the various embodiments thereof.

Also for the sake of simplicity, description, figures, and claims are drawn with reference to flat geometry, but this does not limit the protection scope of the invention to the flat geometry case, since, as the skilled person understands, all teachings of the invention can be extended to the tridimensional case.

The method of the present invention for deactivating the potentially harmful means 202 (FIG. 2) of a wireless set 101 (FIG. 1), when this wireless set 101 is located in a prohibition area 105 where the use those potentially harmful means 202 might be prohibited, is based on the following points:

delimiting a prohibition area 105 as the area covered by a beacon 107 emitted by a beacon apparatus 102, defining a beacon location area 104 as the area containing at least a fraction of the prohibition area 105, locating the wireless set 101 in a wireless set location area 106 taking into account localization uncertainties, emitting a beacon signal 107 carrying a data packet comprising a service identity 301, identifying the beacon 107 as a beacon according to the invention, and a state signal 302, specifying prohibition or permission to use the potentially harmful means 202, receiving the beacon 107 and decoding the carried information by means of the beacon receiver 201, inducing the potentially harmful means 202 to a deactivation state or resuming a regular operation state, according to the state signal 302 contained in the data packet 300.

As shown in FIG. 1, a system according to the invention comprises in fact two apparatuses: a wireless set 101, which connects to a wireless long-range communication network 103, and a beacon apparatus 102, which comprises a transmitter for emitting a beacon 107.

For the sake of simplifying description and easing explanation, in what follows it will be assumed that the prohibition area 105 is the cabin of an aircraft, the beacon apparatus 102 is a transmitter of a Bluetooth technology, the beacon location area 104 is the area of an airport or part of it, the wireless set 101 is a smartphone and/or tablet with mobile connectivity, and the long-range communication network 103 is a cellular network. Accordingly, the potentially harmful means 202 are the electronic circuits implementing the cellular transceiver and the Wi-Fi transceiver of the smartphone/tablet and the beacon receiver 201 is the receiving Bluetooth section of the smartphone/tablet.

These assumptions, however, are not limitative of the applicability of the invention to other types of technologies and mobile communications networks, as the skilled person understands.

The transmission range of the beacon 107 delimits an area, namely the prohibition area 105, where the use of means that are potentially harmful may be prohibited. The transmission power and the radiation pattern of the antenna are tailored to the size and shape of the area to be covered.

The beacon 107 carries a data packet 300 (see FIG. 3), comprising a number of information elements that in part will be considered later on. In particular, it carries a state signal 302, which indicates whether the use of potentially harmful means is prohibited or permitted in the relevant prohibition area 105.

The wireless set 101 comprises a beacon receiver 201 (see FIG. 2), which detects the presence of the beacon 107, receives the beacon 107, and decodes the information that it carries. In order to save on power consumption, the beacon receiver 201 is not always on. Instead, it is activated only in areas where a beacon 107 "might be present" (e.g., airports, hospitals, theatres, museums, holy places, conference rooms, etc.). In fact, the beacon 107 may be not available or operating at all times, as in the case in which the beacon apparatus 102 is installed on an aircraft, where it could be switched off or the aircraft could be far away.

Such areas where a beacon 107 might be received may be substantially larger than a prohibition area. They are called "beacon location area" 104.

The data defining a beacon location area 104 are stored in a beacon location database 206 (FIG. 2) of memory means 204 of the wireless set 101.

The most straightforward way to demarcate a beacon location area 104 is taking as beacon location area 104 a routing area of a GPRS (General Packet Radio Service) network or a tracking area of an LTE (Long-Term Evolution) network or a location area of a GSM (Global System for Mobile communications) network or a location area of a CDMA (Code Division Multiple Access) network. In the cellular networks these areas, which usually are a group of neighbor cells, are identified by a unique identity code that the cellular apparatuses camped on them always know. Therefore, if the beacon location database 206 contains a list of the identities of the cellular network areas in which a beacon 107 could be received, the wireless set 101 may evaluate if it is in a beacon location area 104, and consequently if it has to ensure the activation of its beacon receiver 201, by simply comparing the identity of the network area where it is currently located against the area identities listed in the beacon location database 206.

Another simple way to demarcate a beacon location area 104 is to define it as a disk, which is centered on the position of the relevant beacon apparatus 102 and has a radius k times greater than the transmission range of the beacon 107, where k is a positive real number. The k factor will account for the uncertainty of the transmission range of the beacon 107, the uncertainty of the position of the beacon apparatus 102, and a margin of safety. In this case the wireless set 101 could evaluate if it is in a beacon location area 104, and consequently if it has to ensure the activation of its beacon receiver 201, by calculating the distance of its position from the position of the beacon apparatus 102 (the center of the beacon location area 104) and compare it against the assumed radius of the beacon location area 104.

However, also the position of the wireless set 101 may be affected by an uncertainty, therefore in FIG. 1, and in what follows, instead of considering the position of the wireless set 101 it is considered a "wireless set location area 106", representing the position of the wireless set 101 with its uncertainty. Accordingly, the wireless set 101 is considered to be located in a beacon location area 104 if the beacon location area 104 contains at least a fraction of the wireless set location area 106.

Similarly, a prohibition area 105 is considered part of a beacon location area 104 if the beacon location area 104 contains at least a fraction of the prohibition area 105.

The two ways of delimiting a beacon location area 104 that are described above are only examples of possible ways of defining a beacon location area 104 and are not limitative for other techniques, as the skilled person understands.

The position of the wireless set 101, and its wireless set location area 106, can be obtained through one of the several well known positioning systems, such as GPS or other global navigation satellite systems, and/or local positioning systems based on "beacons" with a limited range, including signals emitted by cellular base stations, Wi-Fi access points, radio broadcast towers, and others beacons and whatever combination of them, which offer different tradeoffs between precision and power consumption. Since smartphones/tablets generally use a positioning system for some purpose, and the location of the wireless set 101, according to the invention, does not require a high precision, the positioning of the wireless set 101 may be obtained by means of the positioning system already in use in the smartphone/tablet, without additional cost and power consumption.

When the beacon apparatus 102 is in an active state, it emits a beacon 107 that carries a data packet 300 (FIG. 1) comprising a service identity 301 and a state signal 302. The service identity 301 identifies the beacon 107 as a beacon according to the present invention, while the state signal 302 specifies prohibition or permission to use potentially harmful means 202. The service identity 301 may be a unique code-word for all the beacon apparatuses 102 according to the invention or may be a combination of such a unique code-word with other information elements identifying a group of wireless sets, or each single wireless set or some characteristic of the set, or some other information. The above additional information could be carried by other information elements not shown in FIG. 3.

These variants, and other that the skilled person may devise, do not limit the protection scope or extension of the invention and the various embodiments thereof.

Thus, a wireless set 101 which is located in the beacon location area 104, hence having its beacon receiver 201 in an active state, has the capability to identify a beacon 107 and decode its carried state signal 302.

According to the state signal 302 received from the beacon apparatus 102, the wireless set 101 induces its potentially harmful means 202 to a deactivation state or to resume a regular operation state.

In an embodiment of the invention, the wireless set 101, for inducing the potentially harmful means 202 to a deactivation state or to resume a regular operation state, activates an audio advice and/or a vibration and/or a still or moving image, inviting its user to set the smartphone/tablet to flight mode or, conversely, to resume regular operation. The audio/video invitation may be repeated for a given time interval or until the flight mode is set.

In other embodiments, in which the wireless sets have means for automatically deactivating and activating the potentially harmful means 202, the wireless set 101 may automatically deactivate the potentially harmful means 202 and resume a regular operation state.

However, the latter alternative may raise security issues, because in some circumstances it would be preferable that the deactivation and activation of important communication means be under the user's control. As an example, in the case of an Aircraft hijacking it would be desirable for the passengers to be able to switch on and off their smartphones/tablets at their will.

Also conceivable is a hybrid solution, whereby the deactivation and activation the potentially harmful means 202 is performed automatically, but the user is given the capability to override the automatic settings.

In one embodiment of the invention "resuming a regular operation state" may mean resuming the state that the wireless sets 101 had before the deactivation of the potentially harmful means 202. In other embodiments, "resuming a regular operation state" may mean resuming the state that the wireless set 101 takes after a regular switching on or another predefined state.

Later on, other variants will be discussed, but at this point, it could be useful to synthesize the basic operation of the method and/or system of the invention as described so far.

In summary, the method of the invention for deactivating potentially harmful means 202 of a wireless set 101, when the wireless set 101 is located in a prohibition area 105 where the use of the harmful means 202 may be prohibited, comprises the following phases:

a first definition phase, in which the prohibition area 105 is defined as the area covered by a beacon 107 emitted by a beacon apparatus 102, wherein the beacon 107 carries a data packet 300, which comprises at least a service identity 301, identifying the beacon 107 as a beacon demarcating a prohibition area 105, and a state signal 302, specifying prohibition or permission to use the potentially harmful means 202;

a second definition phase, in which at least one beacon location area 104 is defined as an area containing at least a fraction of the prohibition area 105, and the data defining at least one beacon location area 104 are stored in the memory means 204 of the wireless set 101;

a location phase, in which the wireless set 101 is located in a wireless set location area 106, which includes the position of the wireless set 101 and has a size that takes into account the uncertainty of the localization data;

a detection phase, in which it is detected if the at least one beacon location area 104 contains at least a fraction of the wireless set location area 106;

an activation phase, in which it is ensured that a beacon receiver 201 of the wireless set 101 is in an active state, if at least a fraction of the wireless set location area 106 is contained in the at least one beacon location area 104;

a search phase, in which the wireless set 101 searches for a beacon 107 that comprises a data packet 300 comprising the service identity 301;

a reception phase, in which the data packet carried by the beacon 107 is received by the wireless set 101 and at least the state signal 302 is decoded;

a generation phase, in which a switch signal is generated in the form of an audio and/or video signal and/or vibration, asking for setting the potentially harmful means 202 to a deactivation state or indicating that a regular operation state can be resumed, according to the state signal 302;

an emission phase, in which the switch signal, generated during the generation phase, is emitted for the user of the wireless set 101.

Figure 2:
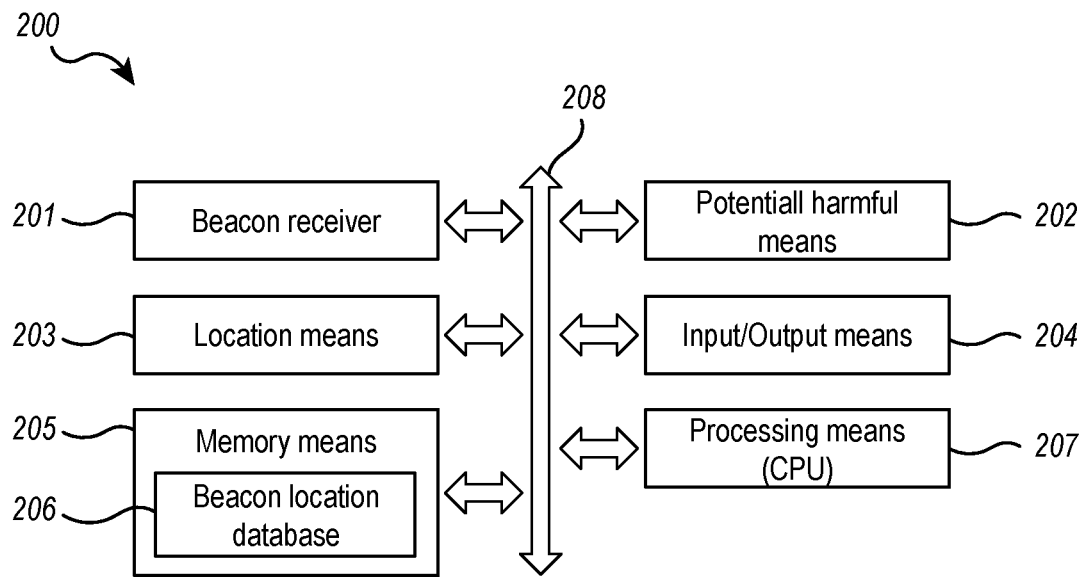
FIG. 2 shows the block diagram of a certain number of elements, which in a wireless set, implement the method according to the invention.

The wireless set 101, which is the main component of the system depicted in FIG. 1, comprises the following main elements (see. FIG. 2):

potentially harmful means 202, which have to be deactivated in a prohibition area 105 when in the prohibition area 105 their use is prohibited, a beacon receiver 201 for wirelessly receiving at least one beacon 107 carrying at least a data packet 300, location means 203 for generating location data defining a wireless set location area 106 where the wireless set 101 is located, memory means 205 for storing program codes and data, input/output means 204 for receiving and issuing data and commands, and processing means 207, in signal communication with at least one of the above elements of the wireless set 101 through a control bus 208, configured for receiving signals and data from at least one of the above elements, executing program codes also on the basis of the received signals and data, and transmitting, to the at least one of the above elements, signals and data.

The main characteristics of the wireless set 101 can be summarized as follows:

the data packet 300 comprises at least a service identity 301, identifying the beacon 107 as a beacon demarcating a prohibition area 105, and a state signal 302, specifying prohibition or permission to use the potentially harmful means 202, the memory means 205 also store a beacon location database 206 defining at least one beacon location area 104 as an area comprising at least a fraction of the prohibition area 105, the processing means 207 are also configured for:
ensuring that the beacon receiver 201 is in an active state in the at least one beacon location area 104, searching for a beacon 107 comprising the data packet 300 with the service identity 301, by means of the beacon receiver 201, generating and emitting, through the input/output means 204, a switch signal, in the form of an audio and/or video signal and/or vibration, asking for setting the potentially harmful means 202 to a deactivation state or indicating that a regular operation state can be resumed, according to the state signal 302 of the beacon 107 that is found by means of the beacon receiver 201.

If the wireless set 101 comprises automatic switch means configured for automatically setting the potentially harmful means 202 to a deactivation state or resuming a regular operation state, according to an electric switch signal received through the control bus 208, the switch signal generated and emitted by the processing means 207 is in the form of an electric signal for said switch means to automatically perform the automatic setting. This electric signal is sent by the processing means 207 to the automatic switch means through the control bus 208 and may be accompanied by some audio and/or video information, generated by the processing means 207 and emitted through the input/output means 204 for the user to become aware of the new settings automatically set.

In the case in which the automatic setting is the deactivation of the potentially harmful means 202, two alternative policies may be adopted: allowing or not the user to override this automatic setting.

If the user is not allowed to override the automatic setting, the processing means 207 are configured for deactivating the capability for the user to activate the potentially harmful means 202 until the smartphone/tablet keeps receiving a beacon 107 that carries a state signal 302 prohibiting the use the potentially harmful means 202.

Otherwise the user may left the capability, e.g. by touching a "permission button", to ask for the permission to activate the potentially harmful means 202 at least for a while. To this purpose the prohibition signal carried by the state signal 302 may have a number of prohibition levels. For example, it may have an absolute prohibition level, which does not allow any permission to activate potentially harmful means. In this case, if the user touches the permission button, the answer will be a polite denial to the permission request, possibly indicating how long the absolute prohibition will last.

A second prohibition level may allow for the transmission of a couple of SMSs, a third level may allow for one or two minutes of phone call, and so on and so forth.

The invention described so far may have several variants tailored for various operation conditions.

A first desirable feature is the authentication of the beacon apparatus 102, in order to prevent fake transmitters from unduly inducing prohibitions or permissions to use potentially harmful means 202. A suitable authentication solution is using asymmetrical cryptography for encrypting at least one information field 302 of the data packet 300. With an asymmetrical cryptography, the state signal 302 may be encrypted with a private key, owned by the beacon apparatus 102, and decrypted with a public key, that can be given to any wireless set 101. The pair of keys may be preset for all apparatuses and once forever, or may be changed with suitable criteria and methods that are well known to people who is expert in the cryptography field.

Another variant of the invention is transmitting, in the data packet 300, a timeout Twt 303 for holding in an active state the beacon receiver 201 of the wireless set 101 for a Twt time interval, starting from the reception instant of the Twt value. This ensures that the wireless set 101 is kept ready to receive data from the beacon apparatus 102 in the event of signal fadings or other interruptions of communication between them. If the timeout Twt 303 expires, the wireless set 101 may resume a regular operation state.

Similarly, the data packet 300 may comprise a timeout Thd 304 for holding the state of the potentially harmful means 202 for a Thd time interval, starting from the reception instant of the Thd value.

There are, in fact, various ways for the beacon apparatus 102 to transmit the state signal 302 carrying prohibition or permission for the potentially harmful means 202. A simple way is to continuously transmit the state signal 302. In this case the wireless apparatus 101 is continuously updated on the state that potentially harmful means 202 should take and, in the case in which the reception of the state signal 302 fails, the wireless apparatus 101 could maintain the current state until the reception of a valid state signal 302 or the expiration of a timeout, e.g. timeout Twt 303 or a timeout Thd 304, which might be more appropriate, or another timeout.

Figure 3:
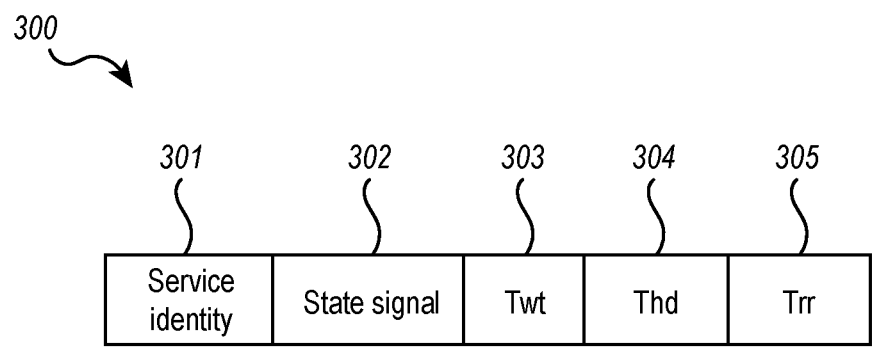
FIG. 3 shows the information elements of a data packet carrying signals and data according to the invention.

Another way for the beacon apparatus 102 to transmit the state signal 302 is a periodic transmission, whereby the state signal 302 is periodically transmitted with a Trr 304 time period, whose value may be transmitted with the data packet 300 (FIG. 3). In this case the wireless set 101 maintains the current state until the reception of a valid state signal 302 or the expiration of timeout Thd 304, with Thd>Trr. If the Trr value is comprised in the data packet 300, the beacon receiver 201 (FIG. 2) may be operated in sleep mode, whereby, after getting synchronized with the repetition period of length Trr, the wireless set 101 may switch off the beacon receiver 201 for most of the time and switch it on for a short time interval around the times at which the data packet 300 is expected.

With the present invention, the potentially harmful means of wireless sets, in particular smartphones/tablets, can be switched off, also in an automatic manner, and on in a secure way, in selected areas that can be mobile, as that of an aircraft cabin. In fact, the implementation of the system requires only a small transmitter for emitting a low-range beacon and a simple application in the wireless sets that have potentially harmful means.

The present description has tackled some of the possible variants, but it will be apparent to the person skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. A wireless set, comprising the following elements:
   potentially harmful means, which have to be deactivated in a prohibition area when in said prohibition area their use is prohibited,
   beacon receiver for wirelessly receiving at least one beacon carrying at least a data packet,
   location means for generating location data defining a wireless set location area where said wireless set is located,
   memory means for storing program codes and data,
   input/output means for receiving and issuing data and commands, and
   processing means, in signal communication with at least one of the above said elements of said wireless set through a control bus, configured for receiving signals and data from said at least one of the above elements, executing program codes also on the basis of said received signals and data, and transmitting, to said at least one of the above elements, signals and data,
   wherein
   said wireless set is adapted to receive and process said data packet comprising at least a service identity, identifying the beacon as a beacon demarcating a prohibition area, and a state signal, specifying prohibition or permission to use said potentially harmful means,
   said memory means also store a beacon location database defining at least one beacon location area as an area comprising at least a fraction of said prohibition area,
   said processing means are also configured for:
      ensuring that said beacon receiver is in an active state in said at least one beacon location area,
      searching for a beacon comprising said data packet with said service identity, by means of said beacon receiver,
   wherein said data packet, received through said beacon receiver, also carries a value for a timeout Twt and said processing means are also configured for holding said beacon receiver in an active state for a time corresponding to said value of said timeout Twt, starting from the reception instant of said Twt value.

2. The wireless set according to claim 1, wherein said wireless set is adapted for generating and emitting, through said input/output means, a switch signal, in the form of an audio and/or video signal and/or vibration, asking for setting said potentially harmful means to a deactivation state or indicating that a regular operation state can be resumed, dependent on said state signal of said beacon that is found by means of said beacon receiver.

3. The wireless set according to claim 1, wherein said wireless set comprises an automatic switch means configured for automatically setting said potentially harmful means to a deactivation state or resuming a regular operation state, dependent on said state signal through an electric switch signal received through said control bus, and wherein said switch signal generated and emitted by said processing means is in the form of said electric signal for said switch means to automatically perform said automatic setting.

4. The wireless set according to claim 1, wherein at least one beacon location area, which is defined in said beacon location database, is a cellular network location area identified by a cellular network location area code.

5. The wireless set according to claim 1, wherein at least one beacon location area, which is defined in said beacon location database, is a disk which is centered on the position of a beacon apparatus and has a radius k times greater than the beacon transmission range, where k is a given positive real number.

6. The wireless set according to claim 1, wherein said data packet, received through said beacon receiver, also carries a value for a timeout Thd and said processing means are also configured for holding the state of said potentially harmful means, which is set according to state signal received through said beacon receiver, for a time corresponding to said value of said timeout Thd, starting from the reception instant of said Thd value.

7. The wireless set according to claim 1, wherein in said data packet at least said state signal is encrypted with a private key so as it can be decrypted with a public key.

8. The wireless set according to claim 1, wherein said wireless set is a phone, smart phone, notebook, tablet-pc, portable music or multimedia player, watch, smart watch or the like.

9. A beacon apparatus for transmission of a beacon carrying at least a data packet, wherein, said data packet comprises at least a service identity, identifying the beacon as a beacon demarcating a prohibition area, and a state signal, specifying prohibition or permission to use a potentially harmful means, and a value for a timeout Twt for holding a beacon receiver of a wireless set in an active state for a time corresponding to said value of said timeout Twt, starting from the reception instant of said Twt value.

10. The beacon apparatus according to claim 9, wherein a portion of said data packet, in particular said at least service identity and/or said state signal, is adapted to initiate on said wireless set the generation and emittance, through a input/output means of said wireless set, a switch signal, in the form of an audio and/or video signal and/or vibration, asking for setting said potentially harmful means to a deactivation state or indicating that a regular operation state can be resumed, dependent on said state signal of said beacon and/or to initiate an automatic setting of said potentially harmful means to a deactivation state or resuming a regular operation state, dependent on said state signal.

11. The beacon apparatus according to claim 9, wherein at least one beacon location area is a disk which is centered on the position of said beacon apparatus and has a radius k times greater than the beacon transmission range, where k is a given positive real number.

12. The beacon apparatus according to claim 9, wherein said data packet also carries a value for a timeout Thd for holding the state of said potentially harmful means, which is set according to state signal received through said beacon receiver, for a time corresponding to said value of said timeout Thd, starting from the reception instant of said Thd value.

13. The beacon apparatus according to claim 9, wherein in said data packet at least said state signal is encrypted with a private key so as it can be decrypted with a public key.

14. The beacon apparatus according to claim 9, wherein said beacon apparatus is integrated in a router, gate, gateway, airplane, helicopter, train, train compartment, tram, door, bus, medical device, elevator, window, moving stairs or the like.

15. A method for deactivating potentially harmful means of a wireless set, when said wireless set is located in a prohibition area where the use of said harmful means may be prohibited, comprising:
- a first definition phase, in which said prohibition area is defined as the area covered by a beacon emitted by a beacon apparatus, wherein said beacon carries a data packet, which comprises at least a service identity, identifying the beacon as a beacon demarcating a prohibition area, a state signal, specifying prohibition or permission to use said potentially harmful means, and a value for a timeout Twt for holding a beacon receiver of said wireless set in an active state for a time corresponding to said value of said timeout Twt, starting from the reception instant of said Twt value;
- a second definition phase, in which at least one beacon location area is defined as an area containing at least a fraction of said prohibition area, and the data defining said at least one beacon location area are stored in the memory means of said wireless set;
- a location phase, in which said wireless set is located in a wireless set location area;
- a detection phase, in which it is detected if said at least one beacon location area contains at least a fraction of said wireless set location area;
- an activation phase, in which it is ensured that said beacon receiver of said wireless set is in an active state, if at least a fraction of said wireless set location area is contained in said at least one beacon location area;
- a search phase, in which said wireless set searches for a beacon that comprises said data packet comprising said service identity;
- a reception phase, in which the data packet carried by said beacon is received by said wireless set and at least said state signal is decoded;
- a generation phase, in which a switch signal is generated in the form of an audio and/or video signal and/or vibration, asking for setting said potentially harmful means to a deactivation state or indicating that a regular operation state can be resumed, according to said state signal,
- an emission phase, in which said switch signal, generated during said generation phase, is emitted for the user of said wireless set.

16. The method for deactivating potentially harmful means of a wireless set according to claim 15, wherein in said generation phase said switch signal is generated in the form of an electric signal for switch means to automatically set said potentially harmful means to a deactivation state or resume a regular operation state, according to said state signal.

17. The method for deactivating potentially harmful means of a wireless set according to claim 15, wherein at least one beacon location area, which is defined in said beacon location database, is a cellular network location area, identified by a cellular network location area code, or a disk which is centered on the position of the beacon apparatus and has a radius k times greater than the transmission range of the beacon, where k is a given positive real number.

18. The method for deactivating potentially harmful means of a wireless set according to claim 15, wherein in said data packet at least one information field is encrypted with a private key so as it can be decrypted with a public key.

* * * * *